Patented July 12, 1927.

1,635,169

UNITED STATES PATENT OFFICE.

LOUIS BENDA, OF MAINKUR, NEAR FRANKFORT-ON-THE-MAIN, GERMANY, ASSIGNOR TO I. G. FARBENINDUSTRIE AKTIENGESELLSCHAFT, A CORPORATION OF GERMANY.

STABLE AND STERILIZABLE SOLUTIONS CONTAINING ORGANIC PHOSPHORUS AND COMPLEX AURO COMPOUNDS.

No Drawing. Application filed June 18, 1926, Serial No. 116,953, and in Germany June 22, 1925.

The aqueous solutions of the dialkylaminoarylphosphinous salts, having probably the general formula:

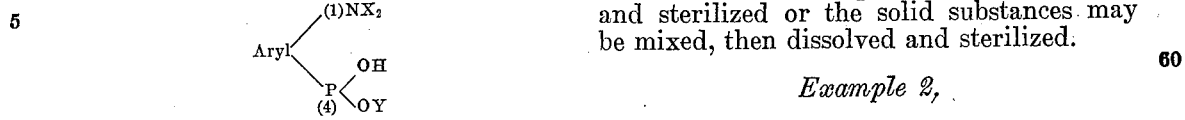

in which formula X means an alkyl radical, Y an alkali metal, are decomposed, when heated, the corresponding aromatic bases being split off.

Now I have found that stable and sterilizable solutions are obtained by allowing to react solutions of these salts on auro-sodium-thiosulfate solutions in the presence of an alkali thiosulfate.

Thereby the formation of complex compounds of addition is to be assumed.

The solutions thus obtained are of a great therapeutic value, because they can be injected without any irritation and they possess no harmful incidental effects, even by using high doses, but an excellent therapeutical power for the treatment of tuberculosic processes, as has been proved by extensive animal and clinical experiments.

This good result is based partly on the auro component, but according to clinical experiments certainly also on the phosphorus component, the phosphorus in form of the dialkylaminoarylphosphinous acids being a valuable help for curing of tuberculosic illnesses and having analeptic properties, as shown by pharmacological and clinical experiments, which is important, for the treatment with aurocompounds by which the muscle of the heart is too much strained.

Example 1.

100 gr. of auro-sodium thiosulfate and 25 gr. of pure sodium thiosulfate are dissolved together in 5 litres of water. Then a solution of 50 gr. of the sodium salt of p-dimethylaminotolylphosphinous acid in 5 litres of water is added and the mixture is sterilized in the usual manner by a current of steam. The solution remains absolutely clear and colorless. By adding hydrochloric acid and sodium nitrite it is colored yellow, a dark colored precipitate separating slowly.

The proportions of the components may be varied within wide limits.

For obtaining the desired effect either the solutions of the components may be mixed and sterilized or the solid substances may be mixed, then dissolved and sterilized.

Example 2, 100 gr. of auro-sodium thiosulfate are intimately mixed with 50 gr. of the sodium salt of p-dimethylaminatolyl-phosphinous acid and 30 gr. of sodium thiosulfate. Then the mixture is dissolved in about 20 litres of water and the solution is filtered through a good filter. Then the clear solution is introduced into ampoules and after closing the ampoules sterilized at about 100° C. for 30 minutes by a current of steam. The solution remains clear and colorless.

Having now particularly described and ascertained the nature of my said invention and in what manner the same is to be performed, I declare, that what I claim is:

1. A process for producing stable and sterilizable solutions, containing organic phosphorus and complex auro compounds consisting in allowing to react solutions of dialkylaminoarylphosphinous salts, having probably the general formula:

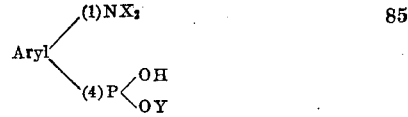

in which formula X means an alkyl radical, Y an alkali metal, on auro-sodium thiosulfate solutions in the presence of an alkali thiosulfate.

2. A process for producing stable and sterilizable solutions, containing organic phosphorus and complex auro-compounds, consisting in mixing a dialkylaminoarylphosphinous salt, having probably the general formula:

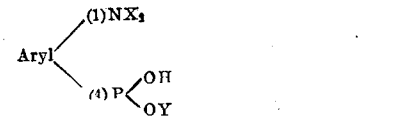

in which formula X means an alkyl radical,

Y an alkali metal, with an auro-sodium-thiosulfate and an alkalithiosulfate in solid form, in then dissolving the mixture and in sterilizing the solution in the usual manner.

3. As new products stable and sterilizable solutions, containing organic phosphorus and complex auro compounds, being clear and colorless solutions, which are colored yellow when hydrochloric acid and sodium nitrite are added, a dark colored precipitate separating out slowly.

In witness whereof I have hereunto signed my name this 4th day of June, 1926.

LOUIS BENDA.